United States Patent [19]

Takeshita et al.

[11] Patent Number: 5,068,843
[45] Date of Patent: Nov. 26, 1991

[54] OPTICAL READ-WRITE APPARATUS

[75] Inventors: Nobuo Takeshita; Teruo Fujita, both of Nagaokakyo, Japan

[73] Assignee: Mitsubishi Denki Kabushiki Kaisha, Tokyo, Japan

[21] Appl. No.: 546,875

[22] Filed: Jul. 2, 1990

[30] Foreign Application Priority Data

Jul. 5, 1989 [JP] Japan ................................. 1-173297

[51] Int. Cl.⁵ .............................................. G11B 7/095
[52] U.S. Cl. ............................ 369/44.13; 369/44.37; 369/44.22
[58] Field of Search ............... 369/44.13, 44.15, 44.18, 369/114, 44.21, 44.22, 44.37, 119

[56] References Cited

U.S. PATENT DOCUMENTS

4,502,762 3/1985 Anderson ......................... 369/44.37

Primary Examiner—Roy N. Envall, Jr.
Assistant Examiner—Hindi Nabil

[57] ABSTRACT

An optical read-write apparatus for reading and writing information in tracks on an optical medium such as an optical disk has two or more beam sources for producing light beams with different wavelengths, and corresponding dichroic mirrors mounted in the path of the beams. Each of the dichroic mirrors reflects light of the wavelength of one of the beams and transmits light of other wavelengths. Piezoelectric transducers are provided for tilting one or more of the dichroic mirrors to adjust the tracking of the beams. An objective lens receives the beams after reflection from the dichroic mirrors and focuses them onto the optical medium.

17 Claims, 13 Drawing Sheets

OPTICAL READ-WRITE APPARATUS

BACKGROUND OF THE INVENTION

This invention relates to an optical read-write apparatus, more particularly to an optical read-write apparatus for focusing two or more light beams of differing wavelengths onto one or more tracks on an optical medium such as an optical disk.

Optical read-write apparatus employing two light beams is known from the prior art. Apparatus has been described in which one beam is used for reading and the other for writing, or in which one beam is used for reading and writing and another beam with a different wavelength is used for erasing. The beams are focused by the same objective lens onto the same track, one ahead of the other, or onto a pair of adjacent tracks. In some systems it may be advantageous to have three or more beams, so that operations can be performed on three or more tracks simultaneously.

In such multiple-beam read-write apparatus it is necessary for each beam to follow its respective track accurately. Rough tracking control is generally performed by moving a carriage on which the objective lens is mounted to a desired position; then fine tracking control is performed by further movement of the carriage, by moving the objective lens from side to side, or by tilting a mirror. In this way it is possible to keep one beam accurately on track. The problem is how to adjust the tracking of the other beam (or beams, in apparatus with more than two beams).

Use of an in-line servo comprising a wedge prism rotatably mounted near the source of the second beam has been proposed. This system, however, tends to produce fatal additional tracking errors when the second beam is moved from track to track by in-line servo control of the wedge prism. In addition, the wedge prism and its driving mechanism are expensive and take up considerable space in the apparatus.

SUMMARY OF THE INVENTION

It is accordingly an object of the present invention to control the position of multiple light beams accurately.

Another object of the invention is to control the position of multiple light beams by compact and inexpensive means.

An optical read-write apparatus for reading and writing information in tracks on an optical medium comprises at least two beam sources for producing light beams with different wavelengths, and at least two dichroic mirrors disposed one above another in the path of the light beams, each of the dichroic mirrors reflecting light of the wavelength of one of the beams and transmitting light of other wavelengths. Piezoelectric means are provided for tilting at least one of the dichroic mirrors. The piezoelectric means may comprise a pair of piezoelectric transducers disposed at opposite edges of at least one of the dichroic mirrors, the piezoelectric transducers expanding and contracting in response to applied voltages. An objective lens receives the light beams after reflection from the dichroic mirrors and focuses them onto the optical medium.

DETAILED DESCRIPTION OF THE INVENTION

Preferred embodiments of the present invention will be described with reference to the drawings. The embodiments exemplify the invention but do not restrict its scope, which should be determined only from the appended claims.

Figure 1:
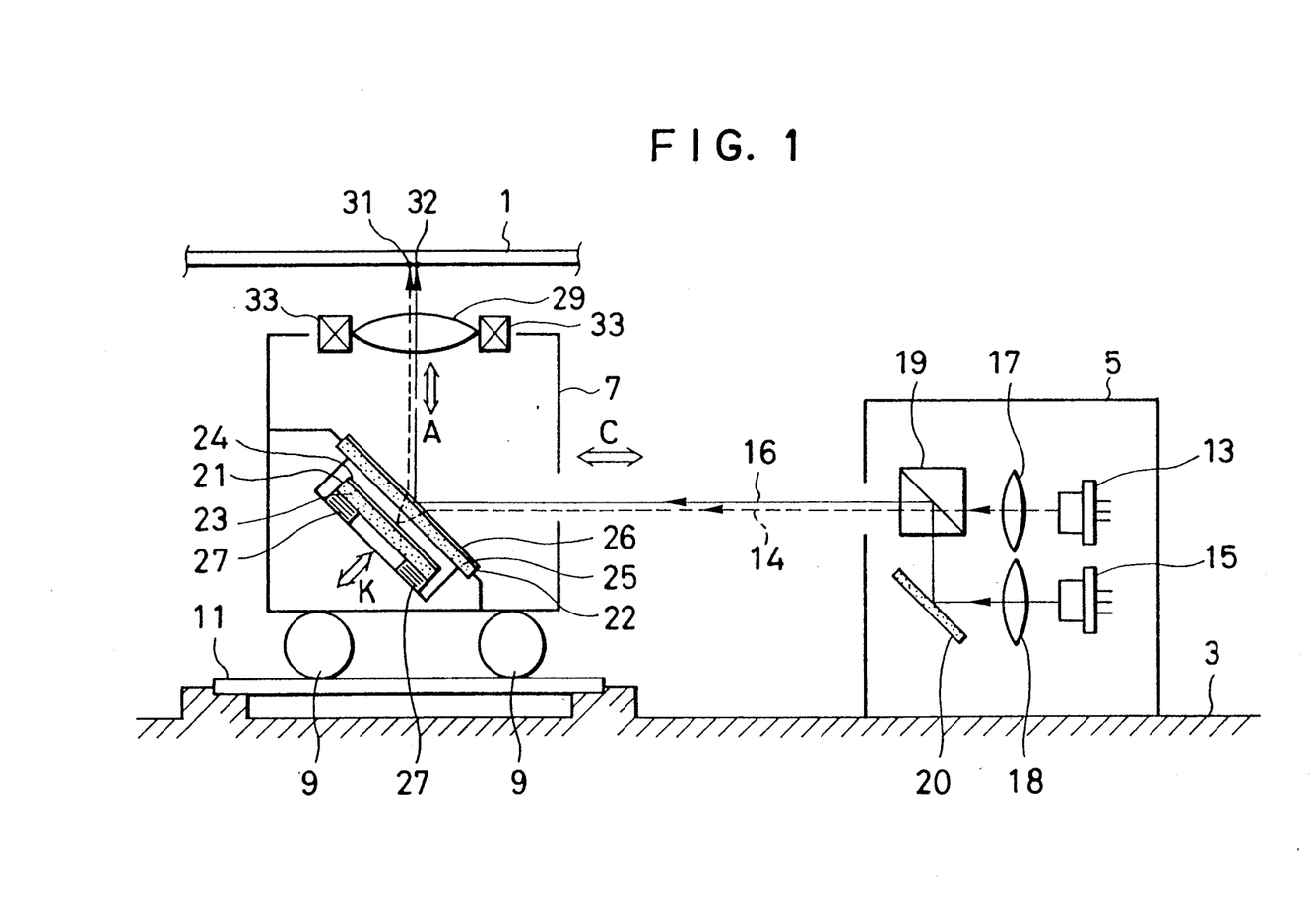
FIG. 1 is a schematic drawing of the invented optical read-write apparatus.

A first embodiment is illustrated in FIG. 1. The optical medium is an optical disk 1 on which information is written in concentric or spiral tracks. The optical read-write apparatus is mounted on a base 3 and comprises two parts: one part mounted in a stationary housing 5 and the other part mounted on a movable carriage 7. The carriage 7 is supported by bearings 9 on a guide shaft 11 fixed to the base 3, and can be moved by a drive mechanism not shown in the drawing toward or away from the stationary housing 5 in order to read or write information in different tracks on the optical disk 1.

Mounted in the stationary housing 5 are a first beam source 13 for producing a first light beam 14 having a first wavelength, and a second beam source 15 for producing a second light beam 16 parallel to the first light beam 14, having a second wavelength different from the first wavelength. The first beam source 13 and the first light beam 14 may be, for example, semiconductor diode lasers or other laser devices. The first and second light beams 14 and 16 pass through respective collimators 17 and 18. The first light beam 14 then passes through a beam splitter 19. The second light beam 16 is reflected from a mirror 20 into the beam splitter 19, then is internally reflected in the beam splitter 19 and joins the first light beam 14.

The first light beam 14 and the second light beam 16 emerge together from the stationary housing 5 and travel to the carriage 7. When driven along the guide shaft 11 as described above, the carriage 7 moves parallel to the axis of the first and second light beams 14 and 16.

Mounted in the carriage 7 in the path of the first and second light beams 14 and 16 are a first dichroic mirror 21 and a second dichroic mirror 22. The first dichroic mirror 21 is mounted below the second dichroic mirror 22, and the first and second dichroic mirrors 21 and 22 are both disposed at an angle of substantially 45° to the first and second light beams 14 and 16. The first dichroic mirror 21 comprises a glass substrate 23 coated with a dichroic film 24 that reflects light of the first wavelength and transmits light of the second wavelength. The second dichroic mirror 22 comprises a glass substrate 25 coated with a dichroic film 26 that reflects light of the second wavelength and transmits light of the first wavelength. The dichroic films 24 and 26 comprise alternate layers of substances with high and low indices of refraction.

Figure 2:
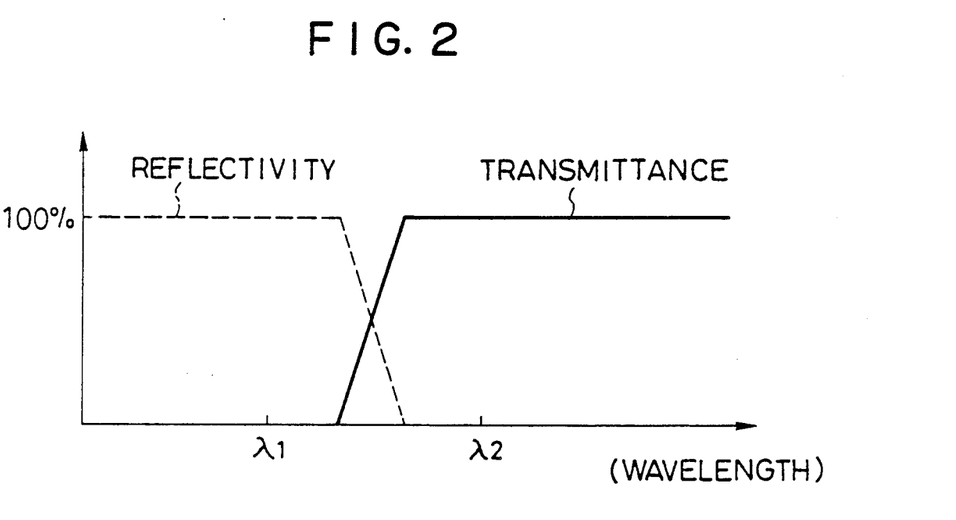
FIG. 2 illustrates transmittance and reflectivity characteristics of the first dichroic mirror in FIG. 1.
Figure 3:
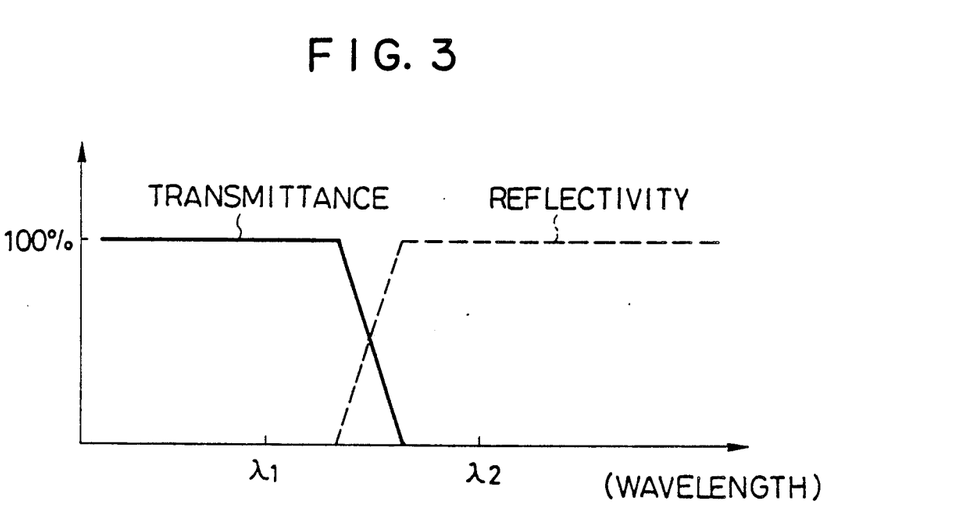
FIG. 3 illustrates transmittance and reflectivity characteristics of the second dichroic mirror in FIG. 1.

FIG. 2 illustrates the transmittance and reflectivity characteristics of the first dichroic mirror 21 in FIG. 1. At the first wavelength $\lambda 1$ reflectivity is 100% and transmittance is 0%. At the second wavelength $\lambda 2$ reflectivity is 0% and transmittance is 100%. FIG. 3 illustrates the transmittance and reflectivity characteristics of the second dichroic mirror 22, which are opposite to the characteristics of the first dichroic mirror 21.

The first dichroic mirror 21 is mounted so that it can be tilted by piezoelectric means comprising a pair of piezoelectric transducers 27 disposed at opposite edges of the first dichroic mirror 21. The piezoelectric transducers 27 expand and contract in the direction of the arrow K in response to applied voltages, which are furnished from a control unit not shown in the drawing. The second dichroic mirror 22 is fixedly mounted in the carriage 7.

Also mounted in the carriage 7 is an objective lens 29 which receives the first and second light beams 14 and 16 after reflection from the first and second dichroic mirrors 21 and 22 and focuses them onto the optical disk 1. The first light beam 14 is focused onto a first beam spot 31, and the second light beam 16 onto a second beam spot 32. In FIG. 1 the first beam spot 31 and the second beam spot 32 are shown for clarity disposed in a pair of adjacent tracks, but it is also possible for the two beam spots to be disposed in the same track, one ahead of the other, as will be shown in FIG. 5. The objective lens 29 is mounted in a focusing means comprising an electromagnet focusing coil 33 adapted to move the objective lens 29 in the direction of the arrow A, perpendicular to the optical disk 1, for focusing adjustment.

Next, the operation of this optical read-write apparatus will be described with reference to FIGS. 1, 4 and 5.

With reference to FIG. 1, the carriage 7 is moved by rough control to the approximate position of the tracks on the optical disk 1 to be written or read, and the first beam source 13 and the second beam source 15 are switched on. The first light beam 14 is collimated by the collimator 17, passes through the beam splitter 19, is transmitted through the second dichroic mirror 22, is reflected by the dichroic film 24 on the first dichroic mirror 21, is transmitted again through the second dichroic mirror 22, and is focused by the objective lens 29 onto the first beam spot 31 on the optical disk 1. The second light beam 16 is collimated by the collimator 18, reflected by the mirror 20 and the beam splitter 19, reflected by the dichroic film 26 on the second dichroic mirror 22, and focused by the objective lens 29 onto the second beam spot 32 on the optical disk 1.

The first light beam 14 and the second light beam 16 are also reflected back from the optical disk 1. The reflected light returns by the same paths to sensors (not shown in the drawing) disposed in the stationary housing 5 which detect the intensity of the returning light. From the detected intensity of the returned light it is possible to determine if the first light beam 14 and the second light beam 16 are correctly focused, and if they are correctly positioned on the desired track or tracks.

On the basis of information from the sensors, the focusing is adjusted by applying a voltage to the focusing coil 33 to move the objective lens 29 perpendicular to optical disk 1.

Also on the basis of information from the sensors, the carriage 7 is moved under fine control to position the second light beam 16 precisely on its desired track. When the second light beam 16 has been positioned, the carriage 7 is held stationary and the first dichroic mirror 21 is tilted by application of appropriate voltages to the piezoelectric transducers 27 to position the first light beam 14 precisely on its desired track.

When both the first light beam 14 and the second light beam 16 have been correctly positioned, their intensities are modulated so as to read, write, or erase information on the optical disk 1. Methods of reading, writing, and erasing information on optical media are well known, and will not be described in detail.

Figure 4:
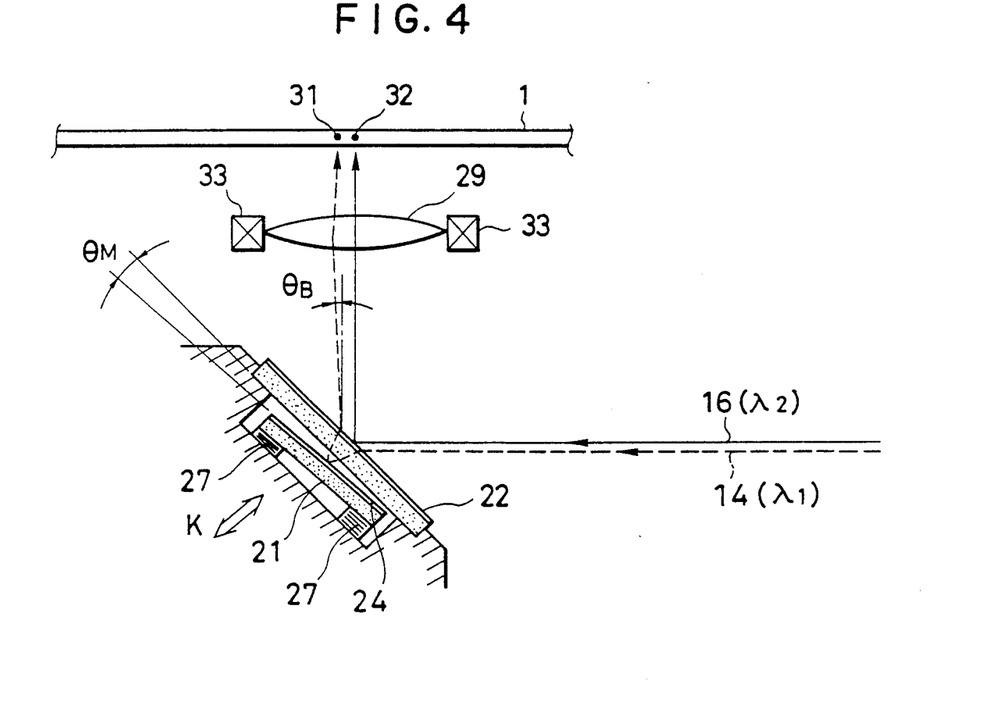
FIG. 4 illustrates tilting of the first dichroic mirror in FIG. 1.

FIG. 4 shows the positioning of the first light beam 14 more clearly. Tilting the first dichroic mirror 21 through an angle $\theta M$ moves the first light beam 14 through an angle $\theta B$ equal to twice $\theta M$. By applying different voltages to the two piezoelectric transducers 27, causing them to expand and contract by different amounts, the first dichroic mirror 21 can be tilted in either direction by an amount sufficient to adjust the position of the first beam spot 31.

Figure 5:
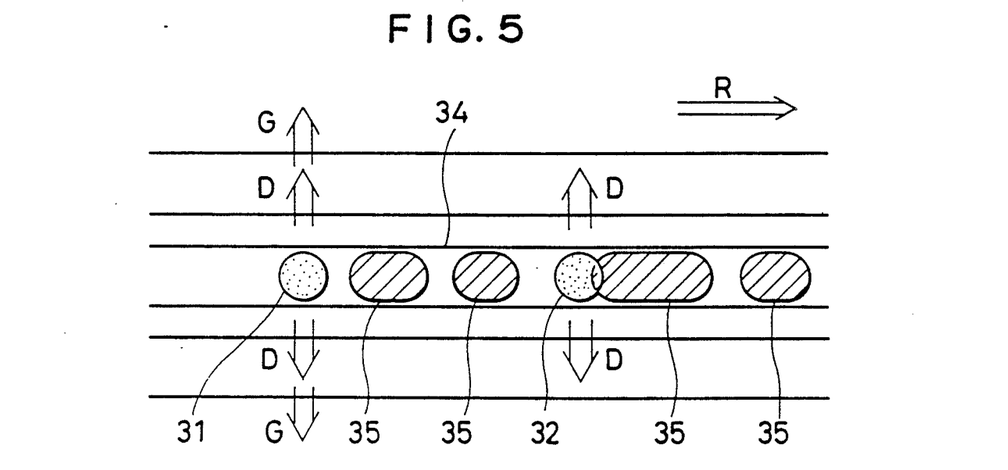
FIG. 5 illustrates tracking adjustment of the light beams in FIG. 1.

FIG. 5 illustrates the adjustment process for the case in which the two beams are focused onto the same track 34 on the optical disk 1. When the carriage 7 is moved, the first beam spot 31 and second beam spot 32 move together, as indicated by the arrows marked D. When the second beam spot 32 has been correctly positioned on the track 34, the first beam spot 31 is further moved by tilting the first dichroic mirror 21, as indicated by the arrows marked G, until the first beam spot 31 is also correctly positioned. The arrow marked R indicates the direction of rotation of the optical disk 1. Recorded information is represented by pits 35 in the track 34.

Figure 6:
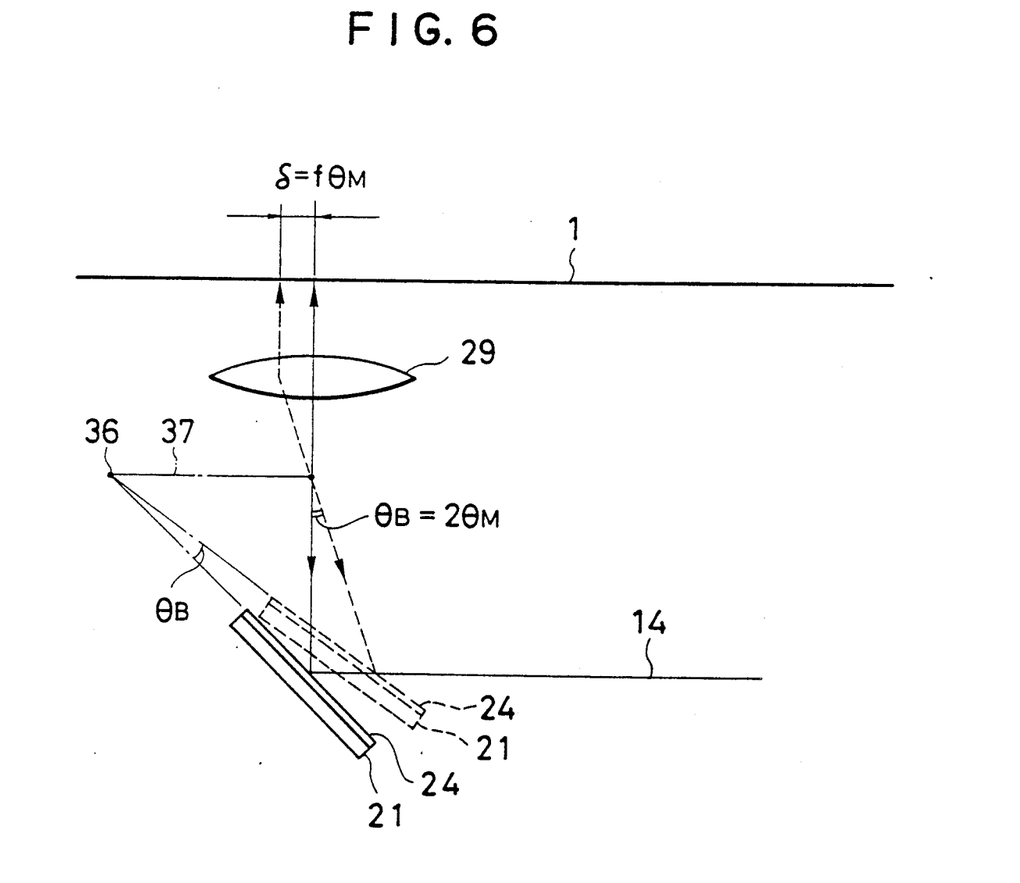
FIG. 6 illustrates an example of a preferred tilting geometry for the first dichroic mirror in FIG. 1.

FIG. 6 illustrates a preferred geometry for tilting the first dichroic mirror 21. The piezoelectric transducers 27 are controlled so that the first dichroic mirror 21, more precisely the dichroic film 24 on the first dichroic mirror 21, rotates about an axis 36 disposed in the first focal plane 37 of the objective lens 29. This ensures that the first light beam 14 will always be incident on the optical disk 1 at a right angle, regardless of the tilt of the first dichroic mirror 21. A useful consequence is that the reflected beam always returns to the sensor on its original path. The axis 36 must of course extend parallel to the tracks on the optical disk 1.

Other embodiments of the invention will next be described with reference to FIGS. 7 to 13.

Figure 7:
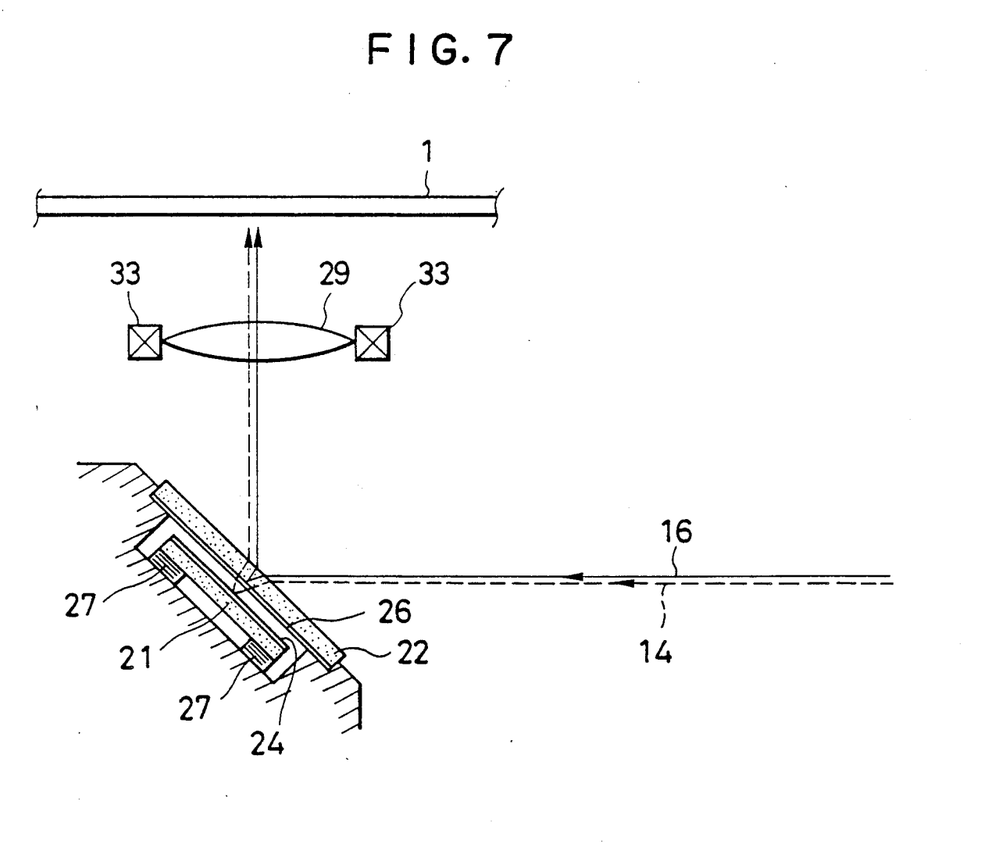
FIG. 7 illustrates an optical read-write apparatus in which the second dichroic mirror is coated on its lower surface.

A second embodiment, illustrated in FIG. 7, is identical to the first embodiment except that the dichroic film 26 is disposed on the lower surface of the second dichroic mirror 22. The dichroic film 24 is disposed on the upper surface of the first dichroic mirror 21 as before. This arrangement brings the two reflecting surfaces into closer proximity, to reduce the separation of the reflected beams. The operation of this embodiment is identical to the operation of the first embodiment, so further description will be omitted.

The concept shown in FIG. 7 of placing the dichroic films on the lower and upper surfaces, respectively, of the upper and lower dichroic mirrors can also be applied in the third and subsequent embodiments described next.

Figure 8:
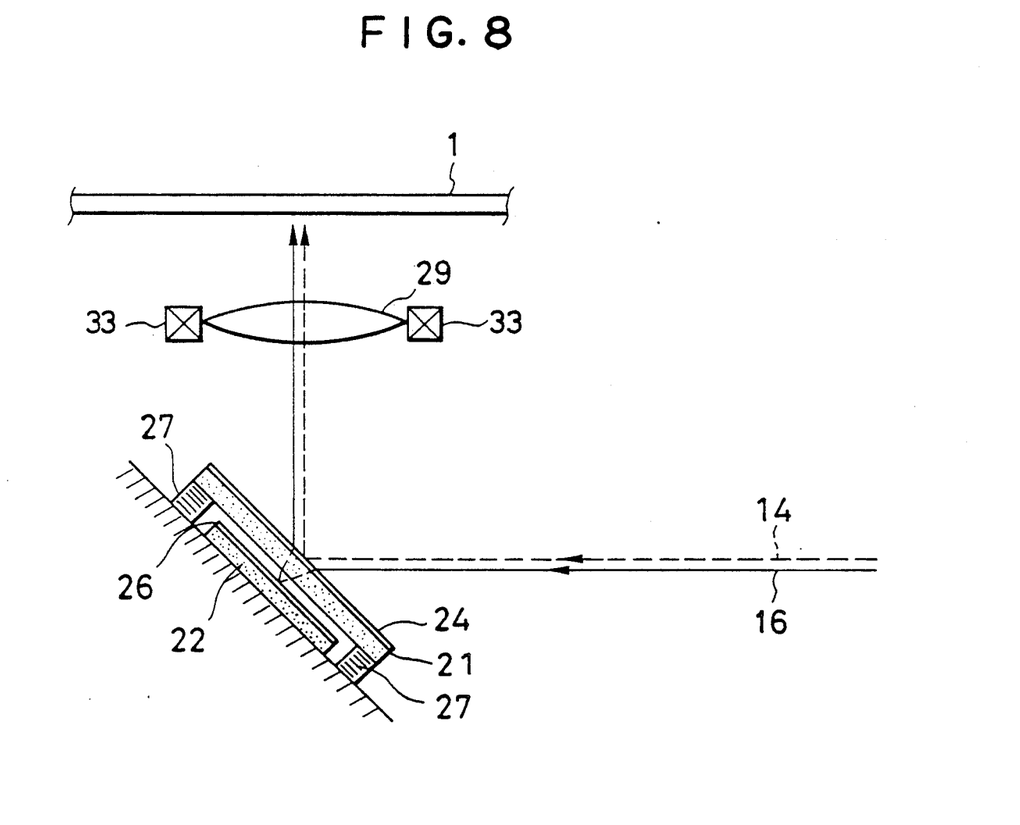
FIG. 8 illustrates an optical read-write apparatus in which the first dichroic mirror is mounted above the second dichroic mirror.

The third embodiment, illustrated in FIG. 8, is identical to the first embodiment except that the first dichroic mirror 21 is mounted above the second dichroic mirror 22, so that the second light beam 16 passes through the first dichroic mirror 21 and is reflected from the second dichroic mirror 22. The third embodiment operates in the same way as the first embodiment, so further description will be omitted.

Figure 9:
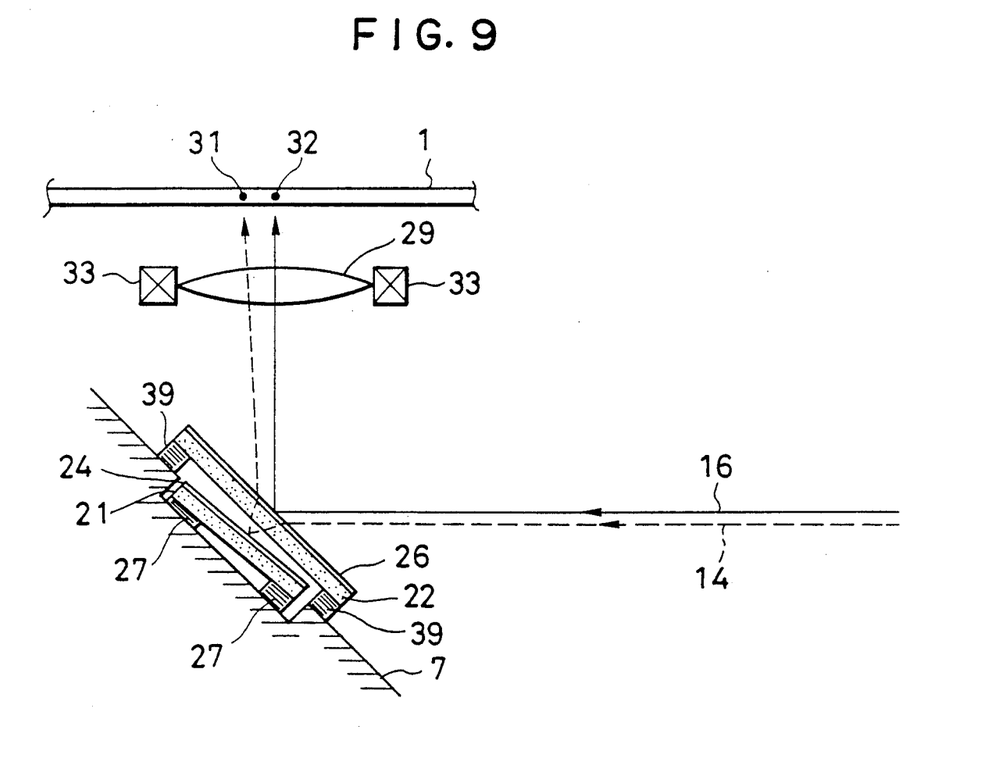
FIG. 9 illustrates an optical read-write apparatus in which both dichroic mirrors can be tilted.

A fourth embodiment, illustrated in FIG. 9, provides piezoelectric means for tilting the second dichroic mirror 22 as well as the first dichroic mirror 21. The piezoelectric means for tilting the second dichroic mirror comprises a pair of piezoelectric transducers 39 fixedly mounted on the carriage 7, supporting opposite edges of the second dichroic mirror 22. By expanding and contracting in response to applied voltages, the piezoelectric transducers 39 tilt the second dichroic mirror 22 in the same way that the piezoelectric transducers 27 tilt the first dichroic mirror 21.

Figure 10:
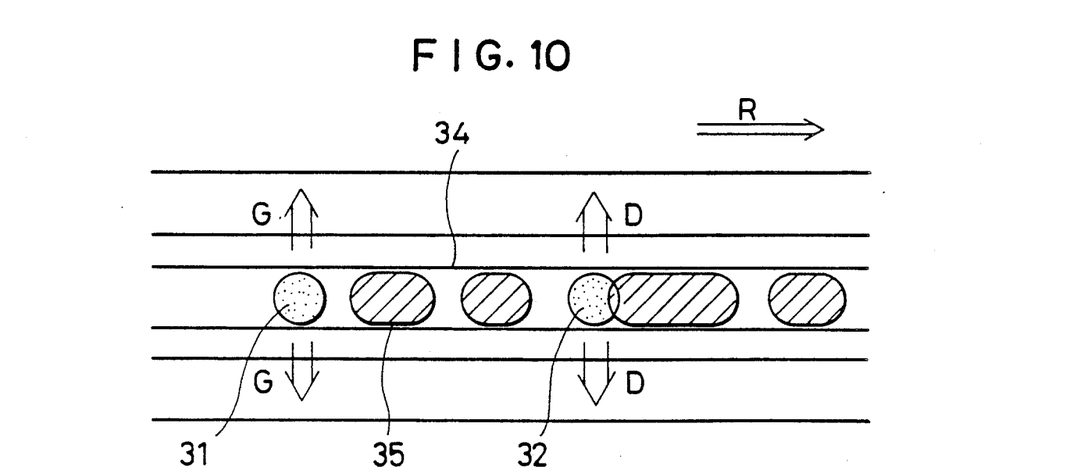
FIG. 10 illustrates tracking adjustment of the beams in FIG. 9.

With reference to FIG. 10, the fourth embodiment enables each light beam to be positioned independently and makes fine control of the position of the carriage 7 unnecessary. After the carriage 7 has been brought to approximately the correct position under rough control, fine control is applied to the piezoelectric transducers 39 to move the second beam spot 32 as indicated by the arrows marked D, to position it on its desired track 34. In addition, fine control is applied independently to the piezoelectric transducers 27 to move the first beam spot 31 as indicated by the arrows marked G and position it on its desired track, which in this drawing is the same track 34.

Figure 11:
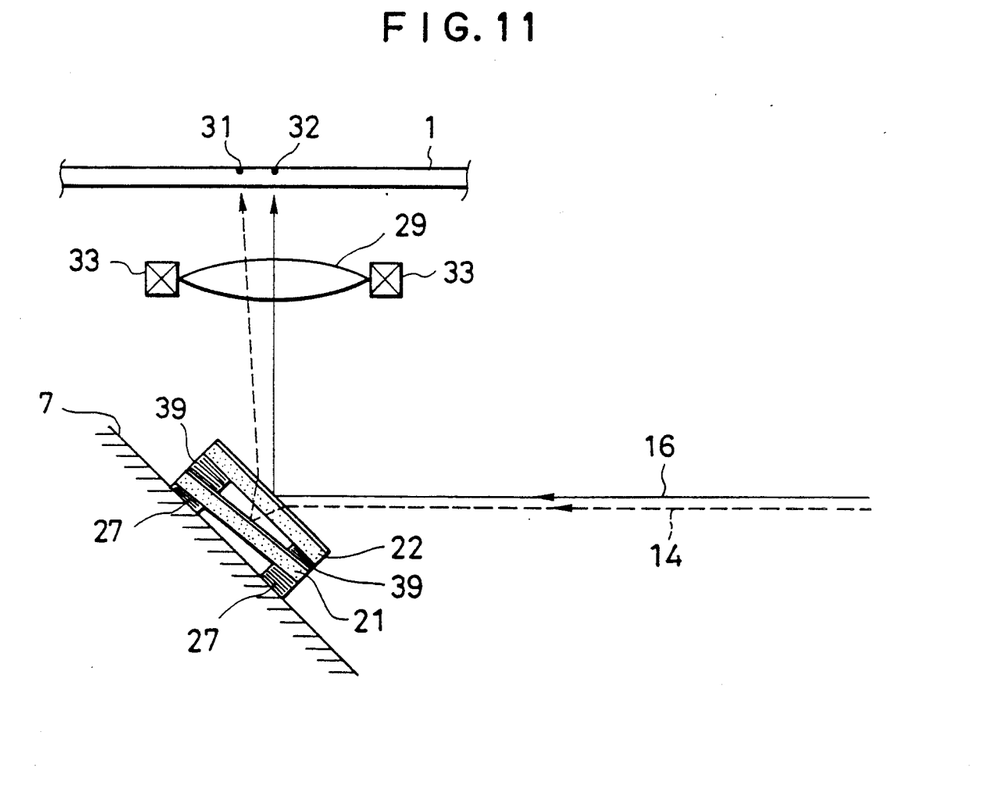
FIG. 11 illustrates another optical read-write apparatus in which both dichroic mirrors can be tilted.

A fifth embodiment, illustrated in FIG. 11, is identical to the fourth embodiment except that the piezoelectric transducers 39 are mounted on the first dichroic mirror 21. In this embodiment first the piezoelectric transducers 27 are controlled to tilt the first dichroic mirror 21 and position the first beam spot 31, then the piezoelectric transducers 39 are controlled to tilt the second dichroic mirror 22 and position the second beam spot 32.

Figure 12:
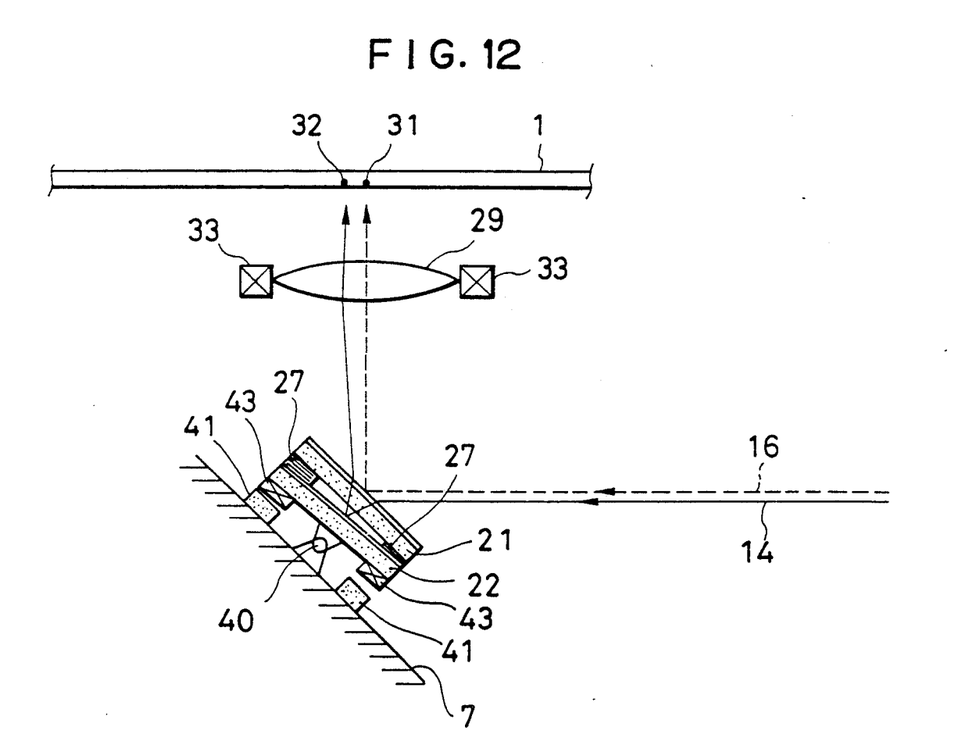
FIG. 12 illustrates yet another optical read-write apparatus in which both dichroic mirrors can be tilted.

A sixth embodiment, illustrated in FIG. 12, is similar to the fifth embodiment except that the first dichroic mirror 21 is mounted atop the second dichroic mirror 22 and the second dichroic mirror 22, instead of being supported by piezoelectric transducers, is rotatably mounted on the carriage 7 by means of a pivot 40. A pair of permanent magnets 41 are attached to the carriage 7 adjacent to opposite edges of the second dichroic mirror 22. A pair of electromagnets 43, mounted on the same opposite edges of the second dichroic mirror 22, rotate the second dichroic mirror 22 by attracting and repelling the permanent magnets 41 in response to applied voltages, thereby tilting the second dichroic mirror 22 to adjust the position of the second beam spot 32. In this embodiment, first the second beam spot 32 is positioned, then the first beam spot 31 is positioned.

Figure 13:
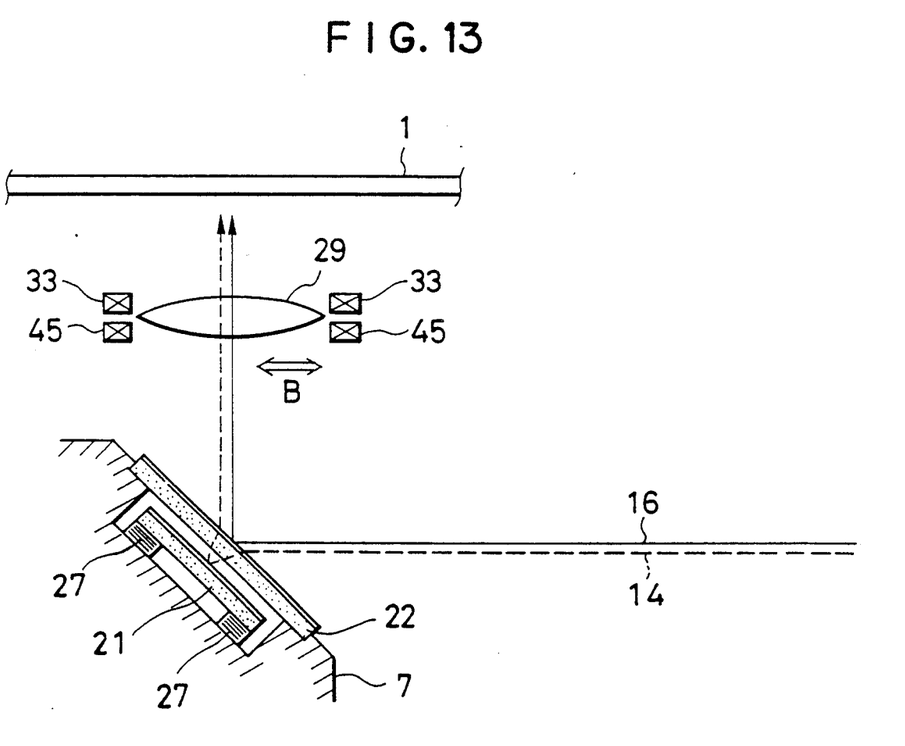
FIG. 13 illustrates an optical read-write apparatus having a tracking coil for moving the objective lens.

A seventh embodiment, illustrated in FIG. 13, has fine-adjustment means comprising an electromagnetic tracking coil 45 for moving the objective lens 29 parallel to the optical disk 1, in the direction of the arrow B. This motion shifts the beam spots across the tracks in the direction of the arrows marked D in FIG. 5, taking the place of fine control of the position of the carriage 7.

One advantage of the present invention is that, since the dichroic mirrors enable independent tracking control of two or more beams at the same point in their mutual optical path, the dichroic mirrors can be located close to the objective lens. This reduces the separation between the outgoing light beam and the returning beam of reflected light, thereby improving the accuracy of tracking control.

Another advantage is that localizing all tracking control at one place reduces the size and cost of the apparatus. In addition, the piezoelectric transducers used to control the dichroic mirrors are small and inexpensive, further reducing the size and cost of the apparatus.

These advantages can be made clearer by comparing the invention with an example of the prior art. Specifically, the invention will be compared with a prior-art apparatus having a wedge prism for in-line servo tracking control of the second beam.

Figure 14:
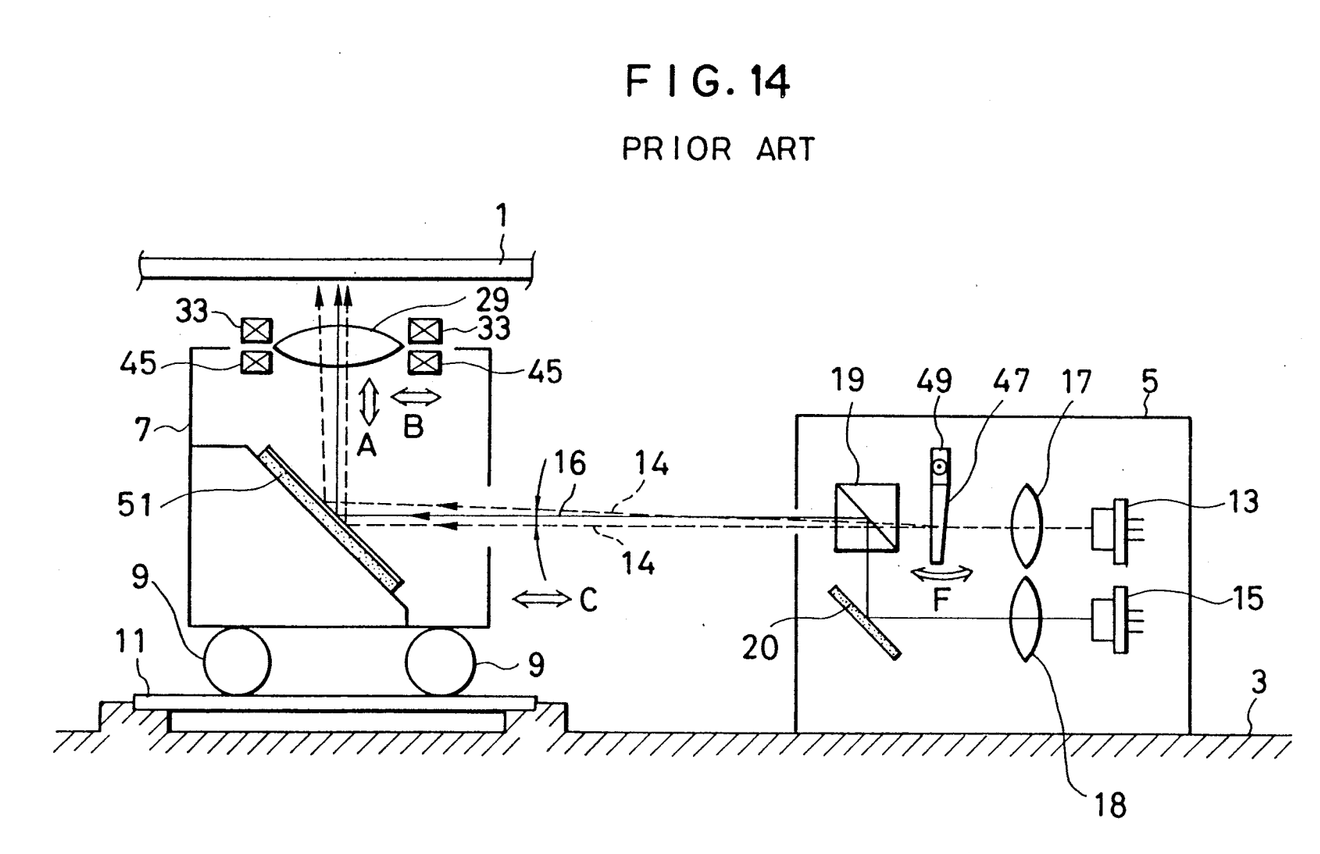
FIG. 14 illustrates a prior-art optical read-write apparatus.

The prior-art apparatus is illustrated in FIG. 14, in which reference numerals identical to reference numerals in FIGS. 1 to 13 denote identical or equivalent elements. The prior-art apparatus differs from the invented apparatus in having a wedge prism 47 rotatably mounted on a pivot 49 in the stationary housing 5 between the first collimator 17 and the beam splitter 19. It also differs in having a single fixed mirror 51 in the carriage 7 for reflecting both the first light beam 14 and the second light beam 16. Like the embodiment in FIG. 13, the prior-art apparatus has both a focusing coil 33 for moving the objective lens 29 in the direction of the arrow A, and a tracking coil 45 for moving the objective lens in the direction of the arrow B.

After the carriage is moved in the direction of the arrow C to the approximate location of the target track or tracks, the focusing coil 33 and the tracking coil 45 are driven to adjust the focusing of the light beams and the tracking of the second light beam 16. The tracking coil 45 produces a motion of both beam spots, the same motion as indicated by the arrows marked D in FIG. 5.

In addition, the wedge prism 47 is rotated in the direction of the arrow F in FIG. 14 to adjust the tracking of the first light beam 14, producing a motion of the first beam spot as indicated by the arrows marked G in FIG. 5.

Figure 15:
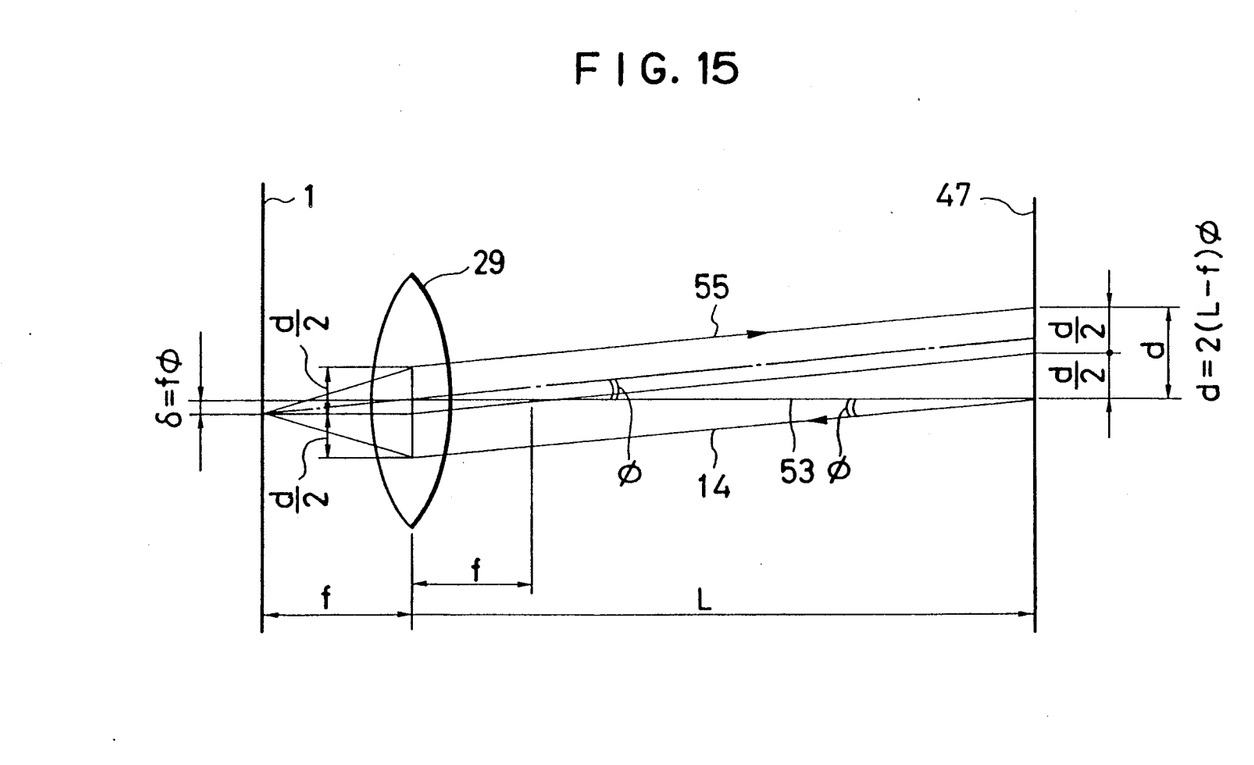
FIG. 15 illustrates beam deflection and the path of the returning light beam.

With reference to FIG. 15, let $\phi$ be the angular deflection of the first light beam 14 produced by rotation of the wedge prism 47, let L be the optical distance from the wedge prism 47 to the objective lens 29, and let f be the focal length of the objective lens. The optic axis 53 is the path that the first light beam 14 would follow with zero rotation of the wedge prism 47.

As the drawing shows, when the first light beam 14 is deflected by an angle $\phi$, the first beam spot is shifted by a distance of $\delta = f\phi$ on the optical disk 1. Moreover, after reflection from the optical disk 1 the beam does not return on its original path, but follows a parallel return path 55 separated by a distance $d = 2(L-f)\phi$ from the original path. This is equivalent to the separation that would be produced by moving the objective lens 29 through a distance of $d/2 = (L-f)\phi$ from the optic axis 53 in the tracking direction (vertically in FIG. 15).

Consider a standard 5-inch optical disk having a track spacing of 1.6 μm, and a typical optical head in which the objective lens 29 has a focal length f=4 mm and the distance to the wedge prism 47 is L=120 mm. To shift the first beam spot by one track (δ=1.6 μm), the first light beam 14 must be deflected by δ/f=1.6 μm/4 mm=0.0004 radians. The resulting separation of the outgoing and returning beams is equivalent to an objective lens motion of (L−f)φ=(120 mm−4 mm)×0.0004=46.4 μm.

Figure 16:
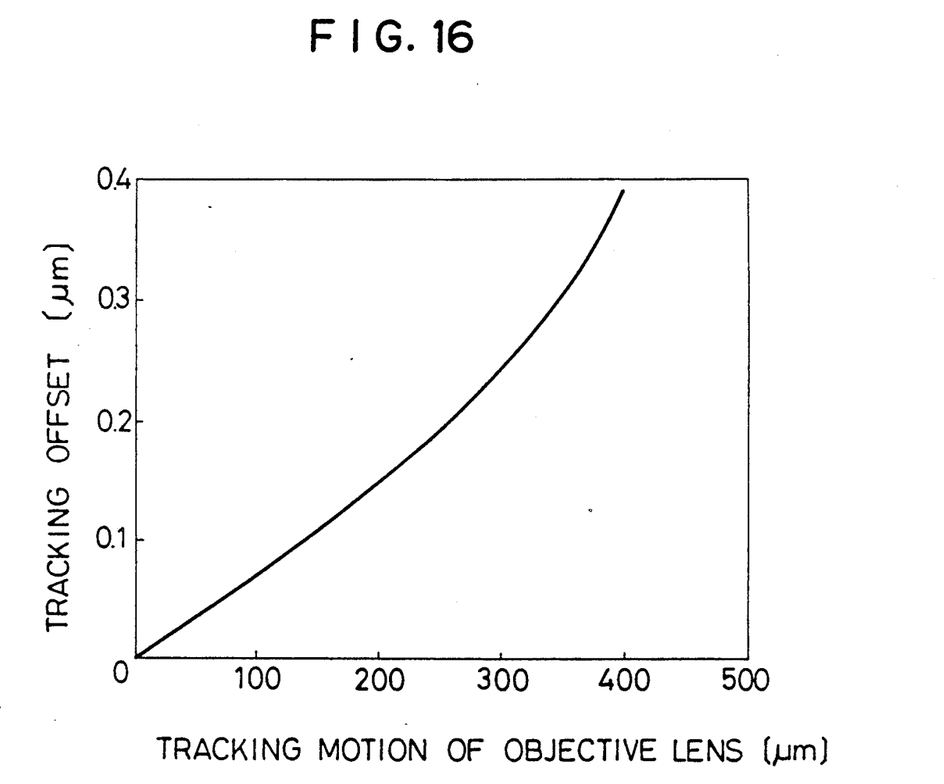
FIG. 16 is a graph of tracking offset in relation to tracking motion of the objective lens.

FIG. 16 shows the relationship between tracking motion of the objective lens and tracking offset due to deviation of the beam axis from the center of the objective lens, when a tracking sensor of the well-known push-pull type is employed. The tracking offset is the amount by which the sensor misjudges the position of the beam spot on the optical disk; the tracking offset is equivalent to a dc offset in the electrical signal output by the sensor. The maximum allowable tracking offset, due to all factors, is considered to be 0.05 μm to 0.1 μm. In the prior-art apparatus under consideration, fine control of the tracking through a distance of only ±1 to ±2 tracks would be enough to exceed the tracking offset tolerance.

In the invention, the distance L is the distance from the first dichroic mirror 21 to the objective lens 29, which is much shorter than the optical distance from the wedge prism 47 to the objective lens 29 in FIG. 14. The tracking offset resulting from a given deflection of the first light beam 14 is accordingly much smaller in the invented apparatus than in the prior art; in fact, the tracking offset owing to beam deflection can be substantially eliminated by employment of the tilting geometry in FIG. 6, which ensures that the reflected light beam always returns on its original path. Another advantage of the invention is that the distance L is constant, while in the prior-art apparatus L varies depending on the position of the carriage 7, further complicating tracking control.

In addition to the embodiments shown in the drawings, the scope of this invention covers many variations and modifications that will be apparent to one skilled in the art. For example, the number of light beams may be increased to three or more beams of different wavelengths, a separate dichroic mirror being provided for each beam. The beam sources and their associated collimators, beam splitters, sensors, and other components can attached to the carriage so that they move with the carriage instead of remaining stationary. Conversely, it is possible to mount the dichroic mirrors in the stationary housing 5, although this arrangement loses some of the advantages noted above.

What is claimed is:

1. An optical read-write apparatus for reading and writing information in tracks on an optical medium, comprising:
    at least two beam sources for producing light beams with different wavelengths;
    at least two dichroic mirrors disposed one above another in paths of said beams, each of said dichroic mirrors reflecting light of the wavelength of one of said light beams and transmitting light of other wavelengths;
    piezoelectric means for tilting at least one of said dichroic mirrors; and
    an objective lens for receiving said light beams after reflection from said dichroic mirrors and focusing them onto said optical medium.

2. The apparatus of claim 1, wherein said piezoelectric means comprises a pair of piezoelectric transducers disposed at opposite edges of at least one of said dichroic mirrors, for expanding and contracting in response to applied voltages.

3. The apparatus of claim 1, wherein said piezoelectric means tilts said dichroic mirror by rotating said dichroic mirror about an axis disposed in a focal plane of said objective lens.

4. The apparatus of claim 3, wherein said axis is disposed parallel to said tracks.

5. An optical read-write apparatus for reading and writing information on an optical medium, comprising:
    a first beam source for producing a first light beam having a first wavelength;
    a second beam source for producing a second light beam having a second wavelength different from said first wavelength;
    a carriage movable in a direction substantially parallel to paths of said first and second light beams;
    a first dichroic mirror, mounted in said carriage in paths of said first and second light beams, for reflecting light of said first wavelength and transmitting light of said second wavelength;
    a second dichroic mirror, mounted in said carriage in paths of said first and second light beams, for reflecting light of said second wavelength and transmitting light of said first wavelength;
    piezoelectric means for tilting said first dichroic mirror; and
    an objective lens for receiving said first and second light beams after reflection from said first and second dichroic mirrors and focusing said first and second light beams onto said optical medium.

6. The apparatus of claim 5, wherein said piezoelectric means comprises a pair of piezoelectric transducers disposed at opposite edges of said first dichroic mirror, for expanding and contracting in response to applied voltages.

7. The apparatus of claim 5, wherein said second dichroic mirror is fixedly mounted in said carriage.

8. The apparatus of claim 7, wherein said first dichroic mirror is mounted below said second dichroic mirror.

9. The apparatus of claim 8, wherein said first dichroic mirror comprises a glass substrate an upper surface whereof is coated with a dichroic film, and said second dichroic mirror comprises a glass substrate a lower surface whereof is coated with a dichroic film.

10. The apparatus of claim 7, wherein said first dichroic mirror is mounted above said second dichroic mirror.

11. The apparatus of claim 5, also comprising piezoelectric means for tilting said second dichroic mirror.

12. The apparatus of claim 11, wherein said piezoelectric means for tilting said second dichroic mirror comprises a pair of piezoelectric transducers fixedly mounted on said carriage, supporting opposite edges of said second dichroic mirror, for expanding and contracting in response to applied voltages.

13. The apparatus of claim 11, wherein said piezoelectric means for tilting said second dichroic mirror comprises a pair of piezoelectric transducers mounted on said first dichroic mirror, supporting opposite edges of said second dichroic mirror, for expanding and contracting in response to applied voltages.

14. The apparatus of claim 6, wherein said second dichroic mirror is rotatably mounted in said carriage, further comprising:
   a pair of permanent magnets mounted in said carriage adjacent to opposite edges of said second dichroic mirror, and;
   a pair of electromagnets mounted on said opposite edges of said second dichroic mirror, for rotating said second dichroic mirror by attracting and repelling said permanent magnets in response to applied voltages.

15. The apparatus of claim 14, wherein said piezoelectric means for tilting said first dichroic mirror is mounted on said second dichroic mirror.

16. The apparatus of claim 5, further comprising focusing means for moving said objective lens perpendicular to said optical medium.

17. The apparatus of claim 5, further comprising fine-adjustment means for moving said objective lens parallel to said optical medium.

* * * * *